United States Patent [19]

Adamic et al.

[11] Patent Number: 5,062,893
[45] Date of Patent: * Nov. 5, 1991

[54] INK FORMULATIONS BY MIXING ANIONIC WATERFAST DYES CONTAINING TWO OR MORE CARBOXYL GROUPS

[75] Inventors: Raymond J. Adamic; Palitha Wickramanayake; Suraj L. Hindagolla; Garold E. Radke; David J. Halko, all of Corvallis, Oreg.

[73] Assignee: Hewlett-Packard Company, Palo Alto, Calif.

[ * ] Notice: The portion of the term of this patent subsequent to Oct. 16, 2007 has been disclaimed.

[21] Appl. No.: 542,862

[22] Filed: Jun. 22, 1990

[51] Int. Cl.$^5$ ............................................. C09D 11/00
[52] U.S. Cl. ........................................ 106/22; 106/20; 534/836; 534/837; 534/824
[58] Field of Search ..................................... 106/22, 20

[56] References Cited

U.S. PATENT DOCUMENTS 4,963,189  10/1990  Hindagolla ............................ 106/22

Primary Examiner—William R. Dixon, Jr.
Assistant Examiner—Margaret Einsmann

[57] ABSTRACT

Inks are provided comprising (a) at least two dyes corresponding to the formula

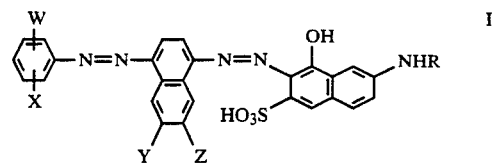

wherein
W is COOH,
X is H, or COOH,
Y is H, COOH, or SO$_3$H,
Z is H, COOH, or SO$_3$H, and
R is H, CH$_2$COOH, or CH$_2$CH$_2$COOH;

with the proviso that there are at least two COOH groups and that the number of COOH groups is equal to or greater than the number of SO$_3$H groups, and (b) a solvent which may be water or a mixture of water and a water-soluble organic solvent provide excellent waterfast prints on paper. The inks preferably have a pH from about 7 to about 9.5. Also preferably, a phosphate is added to reduce kogation and a metal chelating agent is added to further reduce nozzle clogging.

24 Claims, No Drawings

INK FORMULATIONS BY MIXING ANIONIC WATERFAST DYES CONTAINING TWO OR MORE CARBOXYL GROUPS

TECHNICAL FIELD

This application relates to ink formulations for ink-jet printers.

BACKGROUND ART

Thermal ink-jet printers operate by employing a plurality of resistor elements to expel droplets of ink through an associated plurality of nozzles. In particular, each resistor element, which is typically a pad of a resistive material measuring about 50 $\mu m \times 50$ $\mu m$, is located in a chamber filled with ink supplied from a reservoir. A nozzle plate, comprising a plurality of nozzles or fine openings, with each nozzle associated with a resistor element, defines one side of the chamber. Upon energizing of a particular resistor element, a droplet of ink is expelled through the nozzle toward the print medium, whether paper, transparent film, or the like. The firing of ink droplets is typically under the control of a microprocessor, the signals of which are conveyed by electrical traces to the resistor elements, thereby forming alphanumeric and other characters on the print medium.

The tight tolerances of the nozzles (typically 40 to 50 $\mu m$ diameter) require that the ink not clog the nozzles. Further, repeated firings of the resistor elements, which must withstand many millions of firings over the life of the ink cartridge to be commercially practical, can result in fouling of the resistor elements. This is unique to thermal ink-jet printers and is known as kogation.

The ink composition must be capable of interacting with the print medium, especially paper, to penetrate the paper without undue spreading and a subsequent decrease in print quality. Finally, the printed characters must dry rapidly and be waterfast and smear resistant.

Inks are known which possess one or more of the foregoing properties. However, few ink compositions are known that possess all the foregoing properties, since an improvement in one property often results in the degradation of another property. Thus, many inks used commercially represent a compromise in an attempt to achieve an ink evidencing at least an adequate response in each of the foregoing considerations. Accordingly, investigations continue into developing ink formulations which have improved properties and which do not elevate one property at the expense of the others.

In a related patent application entitled, "Waterfast Ink Formulations with a Novel Series of Anionic Dyes Containing Two or More Carboxyl Groups", Ser. No. 07/398,018, filed Aug. 24, 1989, and owned by the same assignee as the present application, inks are disclosed which include a dye corresponding to the formula in the free acid state of

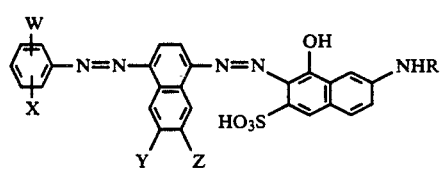

wherein

W is COOH,
X is H or COOH,
Y is H, COOH, or SO$_3$H
Z is H, COOH, or SO$_3$H, and
R is H, CH$_2$COOH, or CH$_2$CH$_2$COOH;

provided that there are at least two COOH groups and that the number of COOH groups is equal to or greater than the number of SO$_3$H groups. The concentration of the dye in the inks ranges from about 0.5 to 20 wt %. The inks further include up to about 30 wt % of a water-soluble organic solvent for the dye and the balance water.

While the above inks are suitably employed in thermal ink-jet printers and evidence excellent waterfast printing on paper, efforts continue to develop further improvements in ink formulations.

DISCLOSURE OF THE INVENTION

The present invention is directed to inks that are particularly suitable for ink-jet printing over a large range of uncoated papers. The inks contain at least two dyes which, in the free acid form, each have the formula:

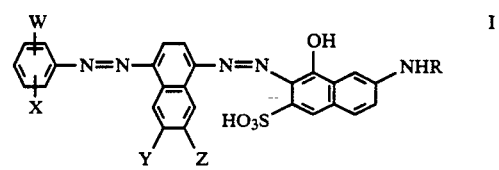

wherein
W is COOH,
X is H or COOH,
Y is H, COOH, or SO$_3$H,
Z is H, COOH, or SO$_3$H, and
R is H, CH$_2$COOH, or CH$_2$CH$_2$COOH;

provided that there are at least two COOH groups and that the number of COOH groups is equal to or greater than the number of SO$_3$H groups.

It is preferred that there are from 2 to 4 COOH groups. It is also preferred that at least two of the COOH groups are attached directly to an aromatic carbon atom.

Where X is H, W may be in the ortho, meta, or para position with respect to the azo group, but is preferably in the para position. However, it is preferred that X is COOH and that the two COOH groups are in the 3,5-, 3,4-, or 2,5- position with respect to the azo group.

It is preferred that there are not more than two SO$_3$H groups, i.e., that Y and Z are not both SO$_3$H. It is also preferred that there are more COOH groups than SO$_3$H groups.

The inks of this invention comprise, by weight, from about 0.5 to 20 wt % dye (total), up to about 30% organic solvent, and the balance mostly water. A buffer is also employed to maintain the ink at a pH between about 7 and about 9.5. Other adjuncts commonly found in ink-jet inks, such as a biocide, may also be added to the inks.

Use of at least two such dyes results in better ink and pen performance. However, even better performance is achieved by adding a phosphate, such as ammonium phosphate, to reduce kogation and by adding a metal chelating agent, such as EDTA, to prevent metal ion precipitates and, consequently, further improve resistance to nozzle clogging.

BEST MODES FOR CARRYING OUT THE INVENTION

The dyes of the above formula can be prepared by diazotization of the corresponding amines, as described in the above-referenced Ser. No. 07/398,018, which is incorporated herein by reference. Examples of suitable mixtures of dyes for use in the inks of this invention are as follows:

Dye I:
W and X are COOH,
Y is H,
Z is $SO_3H$,
R is H;

Dye II:
W and X are COOH,
Y and Z are H,
R is H;

Dye III:
W and X are COOH,
Y is $SO_3H$,
Z is H,
R is H.

The ratio of the dyes may be in any proportion. Preferably, each dye is present in an amount of at least about 10% of the total dye concentration. However, for some applications, ink formulations of equal absorbances may be desirably employed, in order to obtain the best compromise in properties of the ink.

The dyes of the present invention are preferably used in the form of their salts, such as alkali metal ($Na^+$, $K^+$ or $Li^+$) or ammonium or substituted ammonium salt. These are formed by mixing a dye which is in the acid form with a stoichiometric amount of the appropriate base in water. If one starts with the sodium salt of the dye and wishes to convert it to another salt, e.g., ammonium, the sodium form should be acidified to precipitate out the acid form. The acid form is then treated with the appropriate base, e.g., $NH_4OH$. It may be necessary to repeat the acid step and again mix with the base in order to remove all the sodium ions. Preferably, the ammonium salt ($NH_4^+$) of the dyes is employed in the practice of the invention.

The dyes may also be converted to the ammonium salt by an ion exchange process using the ammonium form of a strong acid cation exchange resin. The resin is converted to the ammonium form from the acid form with ammonium hydroxide. This process is described more fully in U.S. Pat. No. 4,786,327, issued Nov. 22, 1988, and assigned to the same assignee as the present application.

The inks preferably contain from about 0.5% to about 20%, more preferably from about 1% to about 10%, by weight of the dyes based on the total weight of the ink, there being at least two dyes present.

Liquid media used for preparing the present inks include water and mixtures of water with various water-soluble organic solvents. When a water-soluble organic solvent is present, it preferably constitutes from about 2% to about 30% of the ink.

The water-soluble organic solvents include $C_1-C_4$ alkanols such as methanol, ethanol, n-propanol, isopropanol, n-butanol, sec-butanol, tert-butanol, isobutanol; amides such as formamide and dimethylacetamide; ketones or ketone alcohols such as acetone and diacetone alcohol; ethers such as tetrahydrofuran and dioxane; nitrogen-containing heterocyclic ketones such as 2-pyrrolidone, N-methyl-pyrrolid-2-one and 1,3-dimethylimidazolid-2-one; polyalkylene glycols such as polyethylene glycol and polypropylene glycol; alkylene glycols and thioglycols containing $C_2-C_6$ alkylene groups such as ethylene glycol, propylene glycol, butylene glycol, triethylene glycol; thiodiglycol, hexylene glycol, and diethylene glycol; other polyols such as glycerol and 1,2,6-hexanetriol; and lower alkyl ethers of polyhydric alcohols such as 2-methoxyethanol, 2-(2-methoxyethoxy)ethanol, 2-(2-ethoxyethoxy)ethanol, 2-methoxy-2-ethoxy-2-ethoxyethanol, 2-[2-(2-methoxyethoxy)ethoxy]ethanol, and 2-[2-(2-ethoxyethoxy)ethoxy]ethanol.

Preferred water-soluble organic solvents among these are glycols and glycol ethers, such as ethylene glycol, diethylene glycol, triethylene glycol and 2-methoxy-2-ethoxy2-ethoxyethanol; polyethylene glycols with molecular weights up to 500; and heterocyclic ketones such as 2-pyrrolidone, N-methylpyrrolid-2-one and 1,3-dimethylimidazolid-2-one. Preferred specific solvent mixtures are a binary mixture of water and diethylene glycol and a binary mixture of water and 2-pyrrolidone.

The inks are preferably applied to a paper medium by means of a thermal ink-jet.

Use of at least two such dyes results in better ink and pen performance, including the following properties:
1) reduction of nozzle clogging,
2) reduction of pen bearding,
3) reduction of ink bronzing on paper,
4) greater pH flexibility, and
5) control of hue characteristics of ink.

Reduction of nozzle clogging is defined as a missing or misaligned nozzle(s) due to crusted or dried ink in the orifice.

Pen bearding is a process where ink crystallizes out of the pen nozzles and can grow to 5 mm or greater in height. The bearding occurs when the pen is left off the capping station of a printer and is exposed to air.

Bronzing of ink on paper refers to a reddish-brown color of the ink upon drying. Many factors affect the amount of bronzing; it is an undesirable property of black inks because of lowered optical densities produced.

As the pH of the ink is lowered, the tendency for clogging and bronzing increases. Stabilization of the pH in the operating range of about 7 to about 9.5 is maintained by the addition of pH buffers. This may include one or more buffers (mixed buffer system) at a concentration from about 0.1 to 5 wt %. The buffers will have pKa's ranging from about 6.5 to 10. Buffers such as TES (N-tris[hydroxymethyl]methyl-2-aminoethanesulfonic acid), BICINE (N,N-bis[2-hydroxyethyl]glycine), TEA (triethanolamine), TRIS (tris[hydroxymethyl]aminomethane, and BORAX (sodium borate decahydrate) may be used alone or in combination with each other or with other buffers.

The hue of a black ink is important with respect to appearance and acceptance by the viewer. For example, a bluish hue tends to be more acceptable to the viewer than a purplish hue.

Biocides may be used in formulating the inks of the invention. Examples of suitable biocides include PROXEL CRL and PROXEL GXL (available from ICI (Great Britain)), and NUOSEPT C and NUOSEPT 95 (available from Nuodex, Inc. (Piscataway, N.J.), although other biocides may be used as well.

Other additives may be added to the ink to provide further improvement in specific properties. These additives are in addition to the pH adjusters and biocides discussed above.

Specifically, a phosphate may be added to the ink to reduce kogation. Kogation is a coined term unique to thermal ink-jet printing and refers to the build-up of residue (koga) on the resistor surface from repeated firings. The build-up of residue tends to degrade pen performance.

Both monobasic ($H_2PO_4^-$) and dibasic ($HPO_4^{2-}$) phosphate are desirably employed. Since the cation associated with the dyes is preferably ammonium, then the ammonium form of the phosphate is preferably employed. However, other cations may alternately be employed. The concentration of the phosphate ranges from about 0.005 to 0.5 wt %, and most preferably is about 0.07 wt %.

One or more metal chelating agents is added to the ink. In particular, the use of metal chelating agents inhibits or prevents the formation of precipitates in the pen which would inhibit normal operation.

It is known from chemical analysis that the inks prepared with carboxyl dyes contain various metal ions, including calcium, iron, and magnesium. Precipitates formed in the nozzle could result in misdirected ink drops or a nozzle which is completely plugged. Precipitates on or near the resistor could also result in lower than normal drop size, which would result in light print or prevent a resistor from ejecting a drop at all.

Complexing agents which have a chelate effect (multiple metal binding sites in a single molecule) are the most desireable additives for preventing metal ion precipitates. Such additives will form complexes with metal ions and thus render them more soluble in the ink, thereby inhibiting the formation of precipitates. Examples of chelating agents that may used are ethylenediaminetetraacetic acid (EDTA), malonic acid, and salicylic acid. EDTA is wellknown for its ability to complex with metal ions, especially calcium. The concentration of the metal complexing agent ranges from about 0.01 to 0.5 wt % of the ink. Preferably, the concentration of EDTA is about 0.1 wt %.

An example of an ink having a combination of the desireable properties disclosed herein is given by:

1 1 wt % Dye I
1.1 wt % Dye II
7.5 wt % 2-pyrrolidone
0.4 wt % buffer (0.2 wt % TRIS and 0.2 wt % BORAX)
0.07 wt % phosphate anion
0.1 wt % EDTA
0.3 wt % PROXEL GXL
the balance water.

This ink has a pH of about 8.5, a viscosity of about 1.3 cp, a surface tension of about 50 dyne/cm, a conductivity of about 8 mS/cm, and an absorbance maximum at 575 nm. The preparation of the dyes to be used in the claimed inks is illustrated in the above-referenced Ser. No. 07/398,018.

The formulation of inks and their resulting properties is now presented by the following examples in which all parts and percentages are by weight unless otherwise indicated.

EXAMPLES

EXAMPLE 1

Inks were formulated using the following dyes:
Dye I:

W and X are COOH,
Y and R are H,
Z is $SO_3H$;

Dye II:
W and X are COOH
Y, Z, and R are H;

Dye III:
W and X are COOH,
Y is $SO_3H$,
Z and R are H.

In one ink using a mixture of dyes, 1.1 wt % of Dye I and 1.1. wt % of Dye II were dissolved in aqueous solutions containing diethylene glycol (DEG) or 2-pyrrolidone (2P), 0.2 to 0.4 wt % BORAX and/or TRIS buffers, up to about 0.3 wt % biocide, and up to about 0.07 wt % phosphate anion (provided by ammonium dibasic phosphate). In this Example, the amounts of the two dyes were chosen to provide substantially equal absorbances.

In another ink using a mixture of dyes, 1.1 wt % of Dye I and 1.1 wt % of Dye III were dissolved in aqueous solutions containing DEG, BORAX 0.2 wt % and TRIS 0.2 wt % buffers, and 0.07 wt % phosphate anion.

Inks having only one of the two dyes present were also prepared for purposes of comparison. In most cases, single dye or dye mixture, the ammonium form of the dye was employed; in one case, a 50:50 mixture of ammonium and methyl amine (MA) counterions was employed.

The inks were tested for various properties as described below.

A. Reduction of Nozzle Clogging

Mixing of Dyes I and II greatly alleviates clogging as noted in Table I below, compared to either Dye I or Dye II alone.

TABLE I

Results of Nozzle Clogging Tests.

| Dye(s) | Ion | Vehicle | % of Missing Nozzles 3 days | 7 days |
|---|---|---|---|---|
| Dye I | $NH_4^+$ | 10% DEG | >10% | — |
| Dye I | $NH_4^+$ | 10% 2P | >90% | >100% |
| Dye I | $NH_4^+$/MA[1] | 10% 2P | 4% | ≧4% |
| Dye II | $NH_4^+$ | 10% 2P | 4-10% | >10% |
| Dye I + II | $NH_4^{+[2]}$ | 10% 2P | 0% | 0% |
| Dye I + II | $NH_4^{+[2]}$ | 7.5% 2P | 0% | 2% |
| Dye I | $NH_4^+$ | 5.5% DEG | 12% (9 days) | |
| Dye I + III | $NH_4^{+[2]}$ | 5.5% DEG | 0% (14 days) | |

Notes:
[1] A 50:50 mixture of counter-ions.
[2] A 50:50 mixture of dyes in terms of absorbances.

Clogging tests were done on mixtures with varying ratios of Dye I and Dye II. These inks also included 0.1 wt % EDTA (the effects of EDTA are discussed in Examples 2-5). The results are listed in Table II below.

TABLE II

Results of Nozzle Clogging Tests for Various Mixtures of Dyes.

| Dye I:II[1] | Ion | Vehicle | % of Missing Nozzles 3 weeks |
|---|---|---|---|
| 30:70 | $NH_4^+$ | 7.5% 2P | <0.1% |
| 40:60 | $NH_4^+$ | 7.5% 2P | <0.1% |
| 50:50 | $NH_4^+$ | 7.5% 2P | <0.1% |
| 60:40 | $NH_4^+$ | 7.5% 2P | <0.1% |

TABLE II-continued

Results of Nozzle Clogging Tests for Various Mixtures of Dyes.

% of Missing Nozzles

| Dye I:II[1] | Ion | Vehicle | 3 weeks |
|---|---|---|---|
| 70:30 | NH$_4$+ | 7.5% 2P | <0.1% |

Notes:
[1]Wt % in terms of absorbances.

By varying the ratio of the two dyes, good resistance to nozzle clogging can also be achieved, as was shown in Table I for a 50:50 mixture.

B. Reduction of Pen Bearding

Mixing of Dyes I and II greatly reduces pen bearding as noted in Table III below, compared to either Dye I or Dye II alone.

TABLE III

| | | Results of Pen Bearding Tests. | | |
|---|---|---|---|---|
| | | | Height of Beard | |
| Dye(s) | Ion | Vehicle | 3 days | 7 days |
| Dye I | NH$_4$+ | 10% DEG | <0.25 mm | — |
| Dye I | NH$_4$+ | 10% 2P | None[1] | None[1] |
| Dye I | NH$_4$+/MA[2] | 10% 2P | 5 mm | ≧5 mm |
| Dye II | NH$_4$+ | 10% 2P | 5 mm | ≧5 mm |
| Dye I + II | NH$_4$+[3] | 10% 2P | 1 mm | ≧1 mm |
| Dye I + II | NH$_4$+[3] | 7.5% 2P | 0.25 mm | <0.5 mm |

Notes:
[1]None because of nozzle clogging.
[2]A 50:50 mixture of counter-ions.
[3]A 50:50 mixture of dyes in terms of absorbances.

C. Reduction of Ink Bronzing

Quantification of bronzing may be done by measuring the optical densities of a blackout pattern on paper and the L*a*b* coordinates. L* is a function of darkness of a sample; a* refers to the amount of red-green component; and b* refers to the amount of blue-yellow component. Typically, a sample which shows a significant amount of bronzing has a larger a* component; however, correlation between a* and bronzing is not perfect. Optical density (O.D.) usually diminishes with bronzing, and can be used as a semiquantitative measure.

Values of L*a*b* and O.D. for various separate dye formulations and mixtures are listed below in Table IV. All samples were printed on Gilbert Bond paper using a DeskJet printer.

Mixing of Dyes I and II reduces bronzing as noted in Table IV below, compared to either Dye I or Dye II alone.

Table IV. Results of Bronzing Measurements.

TABLE IV

| | | Reults of Bronzing Measurements. | | | | |
|---|---|---|---|---|---|---|
| | | | | | L*a*b* | |
| Dye(s) | Ion | Vehicle | O.D. | L* | a* | b* |
| Dye I | NH$_4$+ | 10% DEG | 1.28 | 29.79 | 3.52 | −1.89 |
| Dye I | NH$_4$+ | 10% 2P | 1.31 | 27.22 | 1.80 | −4.97 |
| Dye I | NH$_4$+/MA[1] | 10% 2P | 1.31 | 27.36 | 1.43 | −5.33 |
| Dye II | NH$_4$+ | 10% 2P | 1.32 | 27.68 | 2.29 | −6.62 |
| Dye II | NH$_4$+ | 7.5% 2P | 1.29 | ND | ND | ND |
| Dye I + II | NH$_4$+[2] | 10% 2P | 1.34 | 26.35 | 1.32 | −6.17 |
| Dye I + II | NH$_4$+[2] | 7.5% 2P | 1.32 | 26.49 | 1.12 | −6.84 |
| Dye I | NH$_4$+ | 5.5% DEG | 1.34 | ND | ND | ND |
| Dye I + III | NH$_4$+[2] | 5.5% DEG | 1.30 | ND | ND | ND |
| 30:70 | NH$_4$+[3] | 7.5% 2P | 1.34 | ND | ND | ND |
| 15:85 | NH$_4$+[3] | 7.5% 2P | 1.32 | ND | ND | ND |

Notes:
[1]A 50:50 mixture of counter-ions.
[2]A 50:50 mixture of dyes in terms of absorbances.
ND = Not determined.
[3]Ratio of Dye I to Dye II.

Bronzing tests were also done on various mixtures of Dyes I and II. Increasing the amount of Dye I from 0 to 15 and 30% in the mixture increases the optical density from 1.29 to 1.34 as noted in Table IV above.

D. Greater pH Flexibility

Ink formulations with Dye I have a smaller operating pH range than similar Dye II formulations. Mixing of Dye I with Dye II was observed to extend the effective operating pH range of Dye I. For example, a Dye I/II ratio of 4:1 at pH 7.5 resulted in irreversible nozzle clogging; a 1:1 ratio showed no clogged nozzles after two weeks at this pH. Optical density of a 1:1 ratio of Dye I/II gave a value of 1.30 O.D. at pH 7.5; for Dye I alone, a value of 1.27 O.D. was obtained. Therefore, an operating range of pH 7.5 to 9 can be specified with greater confidence to a mixed dye ink, than Dye I alone.

E. Control of the Hue Characteristics of Ink

Dye I is bluish in hue and is preferred over that of Dye II which has a purplish hue. A blue hue ink would have a small positive a* coordinate with respect to a large negative b* component. Conversely, a purplish hue would have a correspondingly higher a* coordinate. As can be seen from Tables IV (above) and V (below), a mixture of Dye I and Dye II produces an ink with a more bluish hue; a* is less than in Dye II alone.

TABLE V

| | Hue Characteristics of Ink by Mixing Dyes. | | | | | |
|---|---|---|---|---|---|---|
| | | | | | L*a*b* | |
| Dye I:II[1] | Ion | Vehicle | O.D. | L* | a* | b* |
| 60:40 | NH$_4$+ | 7.5% 2P | 1.34 | 26.29 | 0.92 | −6.45 |
| 50:50 | NH$_4$+ | 7.5% 2P | 1.36 | 25.78 | 1.00 | −6.28 |
| 45:55 | NH$_4$+ | 7.5% 2P | 1.34 | 25.90 | 1.03 | −6.46 |
| 40:60 | NH$_4$+ | 7.5% 2P | 1.35 | 26.62 | 1.25 | −6.30 |

Notes:
[1]Wt % in terms of absorbances.

As can be seen in Table V, an increase in the amount of Dye I results in more bluish character, while a decrease in Dye I produces more purplish hue.

From the foregoing results, it is apparent that a mixture of Dye I and Dye II in terms of the properties mentioned above gives better overall performance than either Dye I or Dye II alone.

In the following examples, EDTA was used as the disodium salt. All inks had the following formulation: a 50:50 mixture of two carboxyl-containing dyes with ammonium ion as the cation, 7.5% 2-pyrrolidone, 0.1 wt % of ammonium phosphate (dibasic) to provide a phosphate concentration of 0.07 wt %, 0.3 wt % PROXEL GXL biocide, and the balance water. The two dyes, referring to the formula above, were
Dye I:
W and X are COOH
Y and R are H
Z is $SO_3H$;
Dye II:
W and X are COOH
Y, Z, and R are H.
The pH of the ink was about 8.5. Two different buffering systems were used: Ink A (0.2 wt % sodium borate decahydrate buffer) and Ink B (0.2 wt % sodium borate decahydrate and 0 2 wt % tris[hydroxymethyl]aminomethane buffers).

EXAMPLE 2

EDTA was added to Ink A to a concentration of 0.1% (Ink A+EDTA). Pens were filled with both inks (Ink A alone and Ink A+EDTA) and left uncapped at ambient conditions for seven days. At the end of this period, the pens were printed with a DeskJet printer. Pens with Ink A alone did not print properly (most nozzles were clogged), whereas pens containing Ink A+EDTA did print properly.

EXAMPLE 3

The experiment described in Example 1 was repeated with lower concentrations of EDTA, 0.01% and 0.04%. After being left uncapped for seven days, the pens containing ink with EDTA added printed properly; however, the pens filled with ink that did not contain EDTA did not print (i.e., most of the nozzles were plugged).

Analysis of Ink A used in the above Examples showed the presence of calcium, iron, and magnesium (combined concentration of approximately 10 mg/L), all of which are considered significant impurities at this level. Autopsy of some of these pens revealed deposits in the interior of the pen, specifically, in the inlet channel to the resistor (the "fang area"). Analysis of the deposits by Auger Electron Spectroscopy showed that deposits in Ink A pens contained calcium and iron. However, Ink A+EDTA pens did not have detectable amounts of calcium and had lower concentrations of iron than Ink A deposits.

Further experiments were conducted comparing the performance of Ink B and Ink B+EDTA. Pens were left uncapped for extended periods of time (to allow ample time for deposit formation), with various printing intervals early in this time period and no printing before pen autopsy. The printing cycles and environmental conditions were the same for inks with and without EDTA. The combined concentration of calcium, iron, and magnesium was less than 3 mg/L for Ink B.

EXAMPLE 4

The total elapsed uncapped time was 17 weeks at ambient conditions without printing the last 12 weeks. Pens containing ink B were found to have heavy deposits in the fang area and some deposits uniformly over the resistors. However, pens containing Ink B+0.1% EDTA evidenced relatively smaller residues in the fang area and only traces on the resistors.

EXAMPLE 5

The total elapsed time in this Example was 15 weeks at ambient conditions with no printing at the end before autopsy. Again, the Ink B pens had heavier deposits in the fang and resistor areas compared to Ink B+0.1% EDTA pens. Analysis by Auger Electron Spectroscopy confirmed that the deposits were thicker for the Ink B pens.

From the foregoing, it is evident that the addition of EDTA is beneficial to the performance of inks made with a mixture of two dyes which have carboxyl groups. This has been demonstrated both by differences in printing (EDTA-containing inks survive longer uncapped periods) as well as less precipitation in the firing chambers.

INDUSTRIAL APPLICABILITY

The inks of this invention can be used to print a wide range of papers, especially uncoated papers, using an ink-jet printer.

What is claimed is:

1. An ink comprising, by wt %:
   a) from about 0.5% to about 20% of at least two dyes, each of which, in the free acid state, independently corresponds to the formula

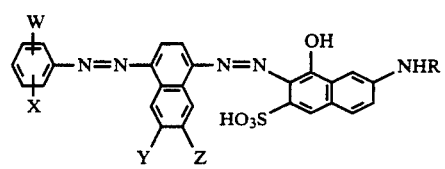

wherein
   W is COOH,
   X is H or COOH,
   Y is H, COOH, or $SO_3H$,
   Z is H, COOH, or $SO_3H$, and
   R is H, $CH_2COOH$, or $CH_2CH_2COOH$;
      provided that there are at least two COOH groups and that the number of COOH groups is equal to or greater than the number of $SO_3H$ groups,
   b) up to about 30% of a water soluble organic solvent for said dye, and
   c) water.

2. The ink of claim 1 wherein each dye comprises at least about 10% of the total dye concentration.

3. The ink of claim 1 comprising two dyes, a first dye wherein W and X are COOH, Y and R are H, and Z is $SO_3H$, and a second dye wherein W and X are COOH and Y, Z, and R are 4. The ink of claim 3 wherein said two dyes are present in a ratio ranging from about 15:85 to 70:30.

5. The ink of claim 1 comprising two dyes, a first dye wherein W and X are COOH, Y and R are H, and Z is $SO_3H$, and a second dye wherein W and X are COOH, Y is $SO_3H$, and Z and R are H.

6. The ink of claim 1 wherein the dye is present in the form of its alkali metal salt or its ammonium or substituted ammonium salt.

7. The ink of claim 6 wherein the alkali metal ion is selected from the group consisting of $Na^+$, $K^+$, and $Li^+$ and wherein the ammonium and substituted ammonium salt is selected from the group consisting of $NH_4^+$, $(CH_3)_4N^+$, $(CH_3)_3NH^{30}$, $(CH_3)_2NH_2^{30}$, and $CH_3NH_3^+$.

8. The ink of claim 1 having a pH from about 7 to about 9.5.

9. An ink comprising, by wt %:
a) from about 1% to about 10% of at least two dyes each independently corresponding to the following formula

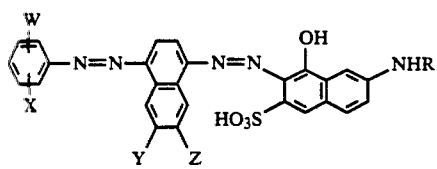

wherein
W is COOH,
X is H or COOH,
Y is H, COOH, or $SO_3H$,
Z is H, COOH, or $SO_3H$, and
R is H, $CH_2COOH$, or $CH_2CH_2COOH$;
provided that there are at least two COOH groups and that the number of COOH groups is equal to or greater than the number of $SO_3H$ groups,
b) about 2% to about 30% water-soluble organic solvent,
c) water, and
d) sufficient buffer to maintain the ink at a pH from about 7 to about 9.5.

10. The ink of claim 9 comprising two dyes, a first dye wherein W and X are COOH, Y and R are H, and Z is $SO_3H$, and a second dye wherein W and X are COOH and Y, Z and R are H.

11. The ink of claim 10 wherein said two dyes are present in a ratio ranging from about 15:85 to 70:30.

12. The ink of claim 9 comprising two dyes, a first dye wherein W and X are COOH, Y and R are H and Z is $SO_3H$, and a second dye wherein W and X are COOH and Y is $SO_3H$, and Z and R are H.

13. The ink of claim 9 wherein the dye is present in the form of its alkali metal salt or its ammonium or substituted ammonium salt.

14. The ink of claim 9 wherein the alkali metal ion is selected from the group consisting of $Na^+$, $K^+$, and $Li^+$ and wherein the ammonium and substituted ammonium salt is selected from the group consisting of $NH_4^{30}$, $(CH_3)_4N^+$, $(CH_3)_3NH^{30}$, $(CH_3)_2NH_2^{30}$, and $CH_3NH_3^+$.

15. The ink of claim 9 wherein the water-soluble organic solvent is an alkanol having 1 to 4 carbon atoms, an amide, a ketone, a ketone alcohol, an ether, a nitrogen containing heterocyclic ketone, a polyalkylene glycol, an alkylene glycol, an alkylene thioglycol, thiodiglycol, a polyol or a lower alkyl ether of a polyhydric alcohol.

16. The ink of claim 15 wherein the organic solvent is diethylene glycol or 2-pyrrolidone.

17. An ink comprising, by wt %:
(a) from about 1% to about 10% total of two dyes each independently corresponding to the following formula

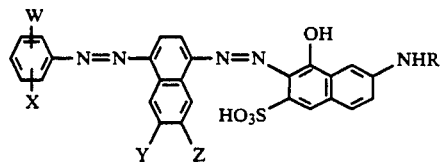

wherein for the first dye:
W and X are COOH,
Y is H,
Z is $SO_3H$, and
R is H; and
wherein for the second dye:
W and X are COOH, and
Y and Z are H, and
R is H;
(b) about 7.5% to 10% of a water-soluble organic solvent selected from the group consisting of 2-pyrrolidone and diethylene glycol;
(c) sufficient buffer to maintain the ink at a pH from about 7 to about 9.5;
(e) about 0.005 to 0.5 wt % of a monobasic or dibasic phosphate;
(f) about 0.01 to 0.5 wt % of a metal chelating agent;
(g) the balance water.

18. The ink of claim 17 wherein said two dyes are present in a ratio ranging from about 15:85 to 70:30.

19. The ink of claim 18 wherein said two dyes are present in a ratio of 50:50.

20. The ink of claim 17 wherein the dye is present in ammonium salt.

21. The ink of claim 17 wherein said metal chelating agent consists essentially of ethylenediaminetetraacetic acid, present in an amount of about 0.1 wt %.

22. The ink of claim 17 consisting essentially of:
(a) about 1.1 wt % of each of said two dyes;
(b) about 7.5 wt % of 2-pyrrolidone;
(c) about 0.2 wt % of sodium borate decahydrate and 0.2 wt % of tris[hydroxymethyl]aminomethane;
(d) about 0.07 wt % of phosphate anion;
(e) about 0.1 wt % of ethylenediaminetetraacetic
(f) about 0.3 wt % of a biocide; and
(g) the balance water.

23. The ink of claim 1 further containing about 0.01 to 0.5 wt % of a metal chelating agent.

24. The ink of claim 9 further containing about 0.01 to 0.5 wt % of a metal chelating agent.

* * * * *